US007616774B2

(12) United States Patent
Lazzeroni et al.

(10) Patent No.: US 7,616,774 B2
(45) Date of Patent: Nov. 10, 2009

(54) CLAMPLESS HEADSET MOUNTING ASSEMBLY (76) Inventors: John J. Lazzeroni, 1415 S. Cherry Ave., Tucson, AZ (US) 85713; Melinda K. Carevich, 1415 S. Cherry Ave., Tucson, AZ (US) 85713

( * ) Notice: Subject to any disclaimer, the term of this patent is extended or adjusted under 35 U.S.C. 154(b) by 855 days.

(21) Appl. No.: 11/256,535

(22) Filed: Oct. 21, 2005

(65) Prior Publication Data
US 2006/0034477 A1 Feb. 16, 2006

Related U.S. Application Data (63) Continuation-in-part of application No. 10/208,898, filed on Jul. 30, 2002, now Pat. No. 6,978,034, which is a continuation-in-part of application No. 09/441,392, filed on Nov. 16, 1999, now abandoned.

(51) Int. Cl.
H04R 25/00 (2006.01)
H04M 1/00 (2006.01)
H04M 9/00 (2006.01)
(52) U.S. Cl. .................. 381/384; 381/374; 379/430
(58) Field of Classification Search .......... 381/361, 381/362, 376, 374, 367, 384, 375, 334; 379/430; 2/421, 422, 425, 905
See application file for complete search history.

(56) References Cited
U.S. PATENT DOCUMENTS

| | | | |
|---|---|---|---|
| 1,085,916 A | 2/1914 | Hutchison | |
| 2,904,645 A | 9/1959 | Sarles | |
| 3,180,333 A | 4/1965 | Lewis | |
| 3,249,873 A | 5/1966 | Whittemore, Jr. et al. | |
| 3,258,534 A | 6/1966 | Goldsworthy | |
| 3,586,977 A | 6/1971 | Lustig | |
| 3,889,190 A | 6/1975 | Palmer | |
| 3,906,547 A | 9/1975 | Aileo | |

(Continued)

FOREIGN PATENT DOCUMENTS

DE 2921434 5/1979

(Continued)

OTHER PUBLICATIONS

Panther Electronics, Panther EAR2001-HC Helmet Communicator, Panther Electronics Product Information (Apr. 19, 2000), http://www.radiodata.com/pather/helmet.

(Continued)

*Primary Examiner*—Tuan D Nguyen
(74) *Attorney, Agent, or Firm*—Quarles & Brady LLP (57) ABSTRACT A clampless mounting assembly is used with a helmet for attaching an internal headset to one of a plurality of different types of external electronic audio communications devices. External audio communications devices communicate with an internal headset by way of electrical conductors inherent in a mounting post. The mounting post is inserted through a hole in the helmet. The mounting post may optionally include a base and a retainer to secure the headset to the helmet, eliminating the need for clamps or adhesives. Alternatively, the headset may be glued to or threaded through an aperture of the helmet. The electrical conductors may be used in a variety of configurations for connecting the headset to one of a plurality of different types of audio communications devices. An external cable, connected to an external audio communications device, is inserted into an external connector inherent in the mounting post.

15 Claims, 11 Drawing Sheets

U.S. PATENT DOCUMENTS

| | | | |
|---|---|---|---|
| 3,908,168 | A | 9/1975 | McMahon |
| 3,916,312 | A | 10/1975 | Campbell |
| 4,152,553 | A | 5/1979 | White |
| 4,607,395 | A | 8/1986 | Sundahl |
| 5,022,100 | A | 6/1991 | Belanger |
| 5,119,505 | A | 6/1992 | Tisseront et al. |
| RE34,525 | E | 2/1994 | Lazzaroni et al. |
| 5,317,643 | A | 5/1994 | Patricelli |
| 5,404,577 | A | 4/1995 | Zuckerman et al. |
| 5,410,746 | A | 4/1995 | Gelber |
| 5,590,209 | A | 12/1996 | Pratt et al. |
| 5,615,410 | A | 3/1997 | DeMars |
| 5,678,205 | A | 10/1997 | Gray |
| 6,075,857 | A | 6/2000 | Doss, Jr. et al. |
| 6,430,298 | B1 | 8/2002 | Kettl et al. |

OTHER PUBLICATIONS

ChatterBox, Rider to Rider/HJC 90, ChatterBox Product Information (May 23, 2000), http://www.hjc-chatterbox.com/html/products/main.html.

Harley-Davidson Motor Company, Stereo Helmet Headset Kit, Harley-Davidson Product Information (Jun. 12, 1997).

Voice-Actuated Communicators, Rider, Apr. 1976, at 54.

Air Rider Helmet Comm, Helmet Headset, Air Rider Helmet Comm Product Information (date unknown).

Arai Helmet, Revolutionary Helmet Sound, Arai Helmet Product Information, at 3, (source and date unknown).

Dick McCarty, CB Radio—Right On for Motorcycles, Rider, Aug. 1976, at 51 et seq.

Ron Nelson, How to Install a CB Outfit that Shouts!, at 50 et seq., (source and date unknown).

Two Way for Two Wheelers, Rider, Apr. 1977, at 48 et seq.

Harley-Davidson Motor Company, Premium Stereo Helmet Headset, Harley-Davidson Product Information, date unknown.

Harley-Davidson Motor Company, Instructions 77126-88, Harley-Davidson Product Information, Aug. 1988.

J&M, Audio System Components for the 1980-1988 Honda Gold Wing, J&M Product Information, circa 1988, at 10 et seq.

J&M, Introducing 3 New Helmet Headsets, J&M Product Information, circa 1998, at A-344 et seq.

J&M, Communications on the Go, J&M Product Information, circa 1998, at A-363 et seq.

Cycle Comm, Cycle-Comm's 2001 Helmet Systems, Cycle Comm Product Information (Aug. 1988).

CLAMPLESS HEADSET MOUNTING ASSEMBLY

RELATED APPLICATIONS

This is a continuation-in-part of Ser. No. 10/208,898, filed Jul. 30, 2002, which is a continuation-in-part of Ser. No. 09/441,392, filed Nov. 16, 1999.

FIELD OF THE INVENTION

This invention is related in general to the field of helmet communications systems for use with audio systems such as citizen's band ("CB") radios, stereos, intercoms, tape and compact disk ("CD") players, and the like. Examples of such audio accessories include speakers, microphones, and the like. In particular, the invention consists of a novel mounting assembly for securing electronic communications components to helmets.

BACKGROUND OF THE INVENTION

Helmets are widely used to enhance the safety of persons riding vehicles such as motorcycles, all terrain vehicles ("ATVs"), and snowmobiles. It is desirable for a wearer of a helmet to be able to communicate with other individuals, be able to listen to radio, tape, CB, MP3, music, GPS audio commands, CD player, or other types of audio signals. It is also desirable for a wearer of a helmet to talk to other individuals. This is accomplished by placing audio accessories such as speakers and microphones on or inside the helmet, in close proximity to the wearer's mouth and ears. This allows a wearer to listen and speak without interfering with the operation of the vehicle. The combination of microphone assembly and speakers is referred to as a helmet headset.

A means for attaching a headset to a helmet is desirable. Additionally, a means for physically supporting a headset so that microphones and speakers are positioned in optimal locations for use by the wearer is desirable. This is usually accomplished by placing a clamp or other mounting assembly on the helmet. Wires are generally used to attach the microphones and speakers to an electrical connector on or near the mounting assembly. Additionally, the mounting assembly may be used to support a microphone assembly. The mounting assembly also typically possesses an electrical connector for attaching the mounting assembly to external communications devices, such as a CD, CB, radio, etc. This provides an electrical connection from external communications devices to the mounting assembly and, by extension, to the audio accessories or headset.

Audio mounting assemblies for attaching audio headsets to helmets are known and have been the subject of numerous U.S. patents. Lazzeroni, et al.'s U.S. Pat. No. Re. 34,525 discloses a headset mount design that uses a clamp to securely attach audio accessories to a location near the bottom edge of a helmet. Pratt's U.S. Pat. No. 5,590,209 discloses a mount that is fastened to the outer side of the helmet using a layer of adhesive material. These methods of attaching audio accessories require that electrical wires run over an edge the helmet. This exposes the wires to the possibility of becoming snagged and damaged.

One patent which discloses a clampless helmet mounting system is Lewis et al.'s U.S. Pat. No. 3,180,333, entitled GAS MASK COMMUNICATION SYSTEM. Lewis discloses a gas mask with a threaded mounting post and an electrical connection pass-through. The pass-through electrical connection is a bayonet connector which allows an external microphone to be removably mounted.

A second patent of interest is Belanger's U.S. Pat. No. 5,022,100, entitled APPARATUS AND METHOD FOR UNDERWATER ACOUSTIC RECEIVING SYSTEM INSTALLATION IN DIVING HELMET. Belanger discloses a hole extending from a diving helmet with a waterproof connector mounted in and positioned partially through said hole and a female plug-receptacle fixedly mounted in a portion of said connector and having at least two contacts for electrical interconnection with a male plug from an acoustic receiving system.

It has become increasingly common for a wearer of a helmet to connect a helmet headset to more than one type or brand of audio system. For example, a wearer of a helmet may wish to connect the headset to an audio/communications system on a Harley Davidson Touring motorcycle and alternatively use the same helmet with the audio system on a Honda Gold Wing along with a CB/FRS communications device on an ATV. This requires that the helmet headset be able to be properly connected to various types of audio or communications devices.

Therefore it is desirable to have a mounting assembly that can be electrically connected to a plurality of different types of audio communications devices.

It is also desirable to have a mounting assembly that can be electrically connected to a plurality of different audio accessories.

It is likewise desirable to have a mounting assembly that can provide physical support for boom microphones.

It is desirable to have a mounting assembly wherein electrical pathways pass through a helmet, allowing electrical communications devices external to a helmet to be electrically connected to audio accessories internal to the same helmet.

It is further desirable to have a mounting assembly which will allow a plurality of different types of audio communications devices to be electrically connected to and function with a plurality of different types of audio accessories.

BRIEF SUMMARY OF THE INVENTION

The clampless headset mounting assembly according to this invention comprises a mounting post which is inserted through an aperture in a helmet. The mounting post possesses multiple electrical conductors which run through the mounting post culminating at a mounting post connector.

An external connector is used to electrically attach the mounting post connector to wires or cable assemblies which are, in turn, connected to audio communications devices residing on an associated vehicle.

The mounting post is, in turn, connected to a microphone assembly and speakers. An optional base on the interior end of the mounting post may assist in supporting the mounting post inside the helmet. Additionally, an optional retainer may be used on the external end of the mounting post to secure the mounting post to the outside of the helmet. Alternatively, the mounting post may be secured to the helmet by gluing the mounting post to the aperture of the helmet or by threading the mounting post into the helmet's aperture.

The mounting post includes numerous individual electrical connectors which may be used in a plurality of combinations. The audio system that the type of headset is used with will determine which of various hookup cord assemblies will be used to connect the helmet headset to the audio system.

Likewise, in order to use the mounting assembly with a plurality of different types of audio communications devices and their associated cables or wire harnesses, the external connector is comprised of numerous individual electrical connectors which may be used in a plurality of combinations. The type of audio communications device and its associated cable or wire harness will determine which of the individual electrical connectors comprising the external electrical connection is used.

The multiple electrical conductors which travel through the mounting post may be used in a plurality of different combinations. This allows numerous types of headsets to be electrically connected to numerous types of audio communications devices.

Accordingly, it is a principal object of this invention to provide a means for passing multiple electrical conductors through a helmet which also secures a headset to the helmet.

It is another object of this invention to provide a means for electrically connecting an internal headset to one of a variety of external audio communications devices.

The present invention meets the aforementioned needs by securing a headset assembly to a helmet, supporting the headset microphone assembly, and electrically connecting the headset to one of a plurality of different types of external communications devices and its associated cable assembly. Various other purposes and advantages of the invention will become clear from its description in the specification that follows and from the novel features particularly pointed out in the appended claims.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
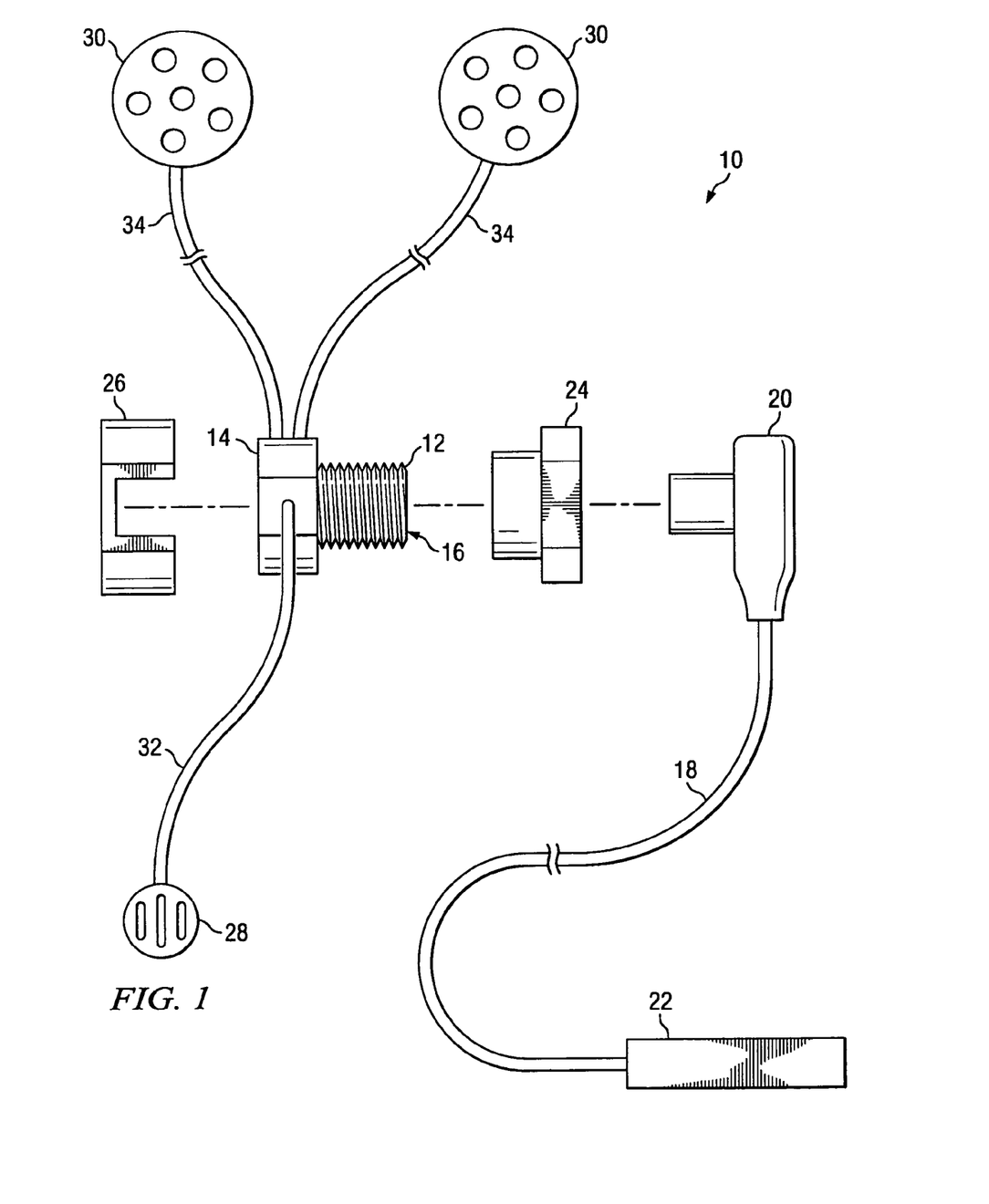
FIG. 1 is an exploded view illustrating the main components of a clampless headset mounting assembly according to the invention.

A clampless helmet mounting assembly 10 is shown in FIG. 1. A mounting post 12 contains multiple alternative electrical pass-through conductors or wires which run from one end of the post to an opposite end of the post. In this embodiment of the invention, one end of the mounting post 12 is formed into a base 14 which is used to support the post inside the helmet. The other end of the post forms a multiple-conductor post connector 16. This post connector 16 is used to electrically couple the multiple electrical pass-through conductors of the post 12 to a wire harness or cable 18. The wire harness 18 can be used to connect the helmet headset to an audio communication device. Alternatively, the wire harness 18 can be used as an adapter cable to connect the helmet headset to yet another cable which is, in turn, connected to an audio communication device. The connector 16 also provides physical support for a connector 20 inherent in the cable 18. The cable 18 is used to provide an electrical connection between the helmet mounting assembly 10 and one or more external electrical communications devices 22 such as a radio, Cd player, tape player, or wireless telephone. In this use of the invention, these external electrical devices reside on a vehicle such as a motorcycle, bicycle, ATV, or snowmobile.

The mounting post is inserted into an aperture which has been created in a helmet. A retainer 24 is used to engage the mounting post 12 and attach the mounting assembly to an exterior side of the helmet. The combination of the base 14 and the retainer 24, along with the mounting post 12 itself, secure the mounting assembly to the helmet. Numerous methods could be used to secure the mounting post to the helmet, such as a clip assembly or jagged retaining posts, etc. In this embodiment of the invention, a threaded post and a threaded retainer are used. The retainer 24 could be designed to completely encapsulate the mounting post threads. This would protect the threads from being damaged by contact with sides of the hole passing through the helmet. An optional protective cover 26 is used to provide a cushion between the mounting assembly 10 and the cheek or head of a wearer of the helmet. In this embodiment of the invention, the mounting post 12 comprises external threads and the retainer 24 comprises internal threads for engaging the external threads of the post.

The multiple electrical conductors passing through the post 12 are connected to one or more transducers such as a microphone 28 or one or more speakers 30. In this embodiment of the invention, a boom microphone assembly 32 is attached to and supported by the base 26. A variation of this embodiment of the invention may possess a microphone attached to the interior front surface of a full coverage style helmet, eliminating the need for the base 26 to support a boom. Electrical conductors or wires electrically connect the microphone 28 to the conductors passing through the post. The microphone assembly 32 may be comprised of a microphone 28, electrical wires, and a boom. A boom, if used, allows the wearer of the helmet to position the microphone 28 in a position which is comfortable and effective for converting his/her speech into electrical signals. These signals are passed through the microphone assembly 32, through the base 14, through the post 16, and through the cable 18 to an external electrical communications device 22.

Electrical signals originating from the external electrical communications device 22 are passed through the cable 18, through the post 12, through the base 14, and through wires 34 to one or more speakers 30. The speakers 30 convert the electrical signals into acoustical energy.

Figure 2:
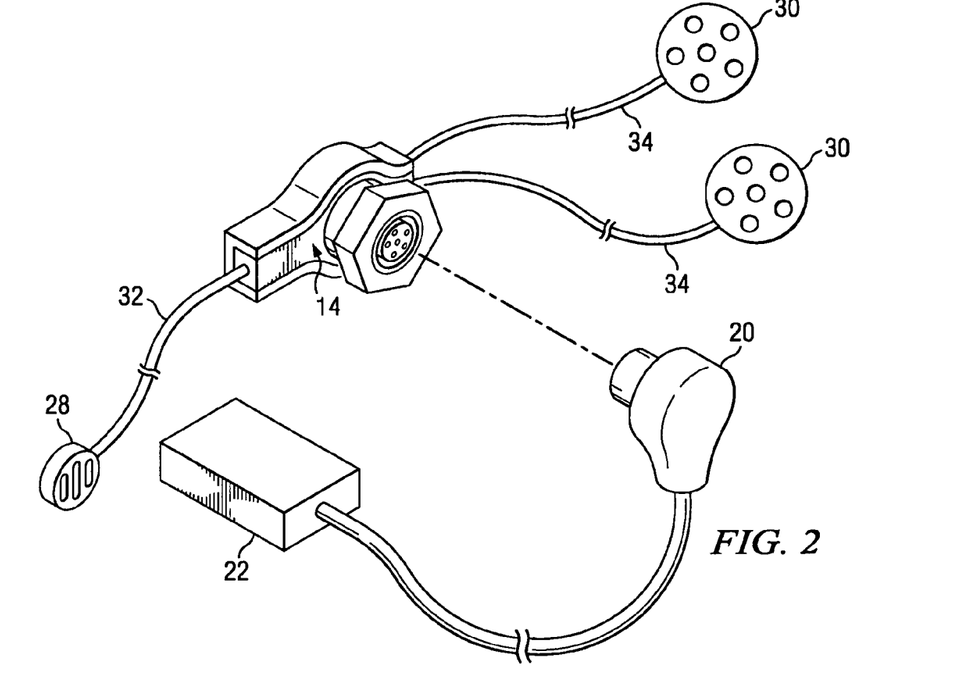
FIG. 2 is a perspective side view of the clampless headset mounting assembly of FIG. 1 illustrating electrical connectivity according to the invention.
Figure 3:
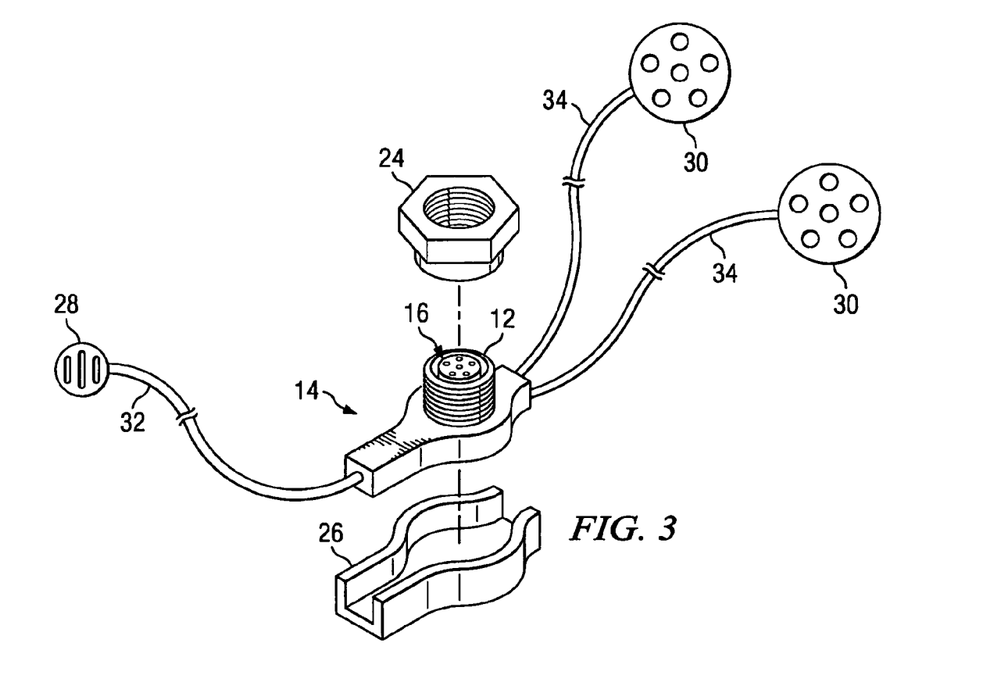
FIG. 3 is an exploded view of the electronics housing, threaded retainer, cheek cushion, microphone wire, and speaker wires of the clampless headset mounting assembly of FIG. 1.

A side perspective view of the clampless helmet mounting assembly 10 is shown in FIG. 2. FIG. 3 is an exploded view of the base 14, threaded post 12, threaded retainer 24, cheek cushion 26, microphone assembly 32, speaker wires 34, connector 16, and speakers 30 of the clampless headset mounting 10.

Figure 4:
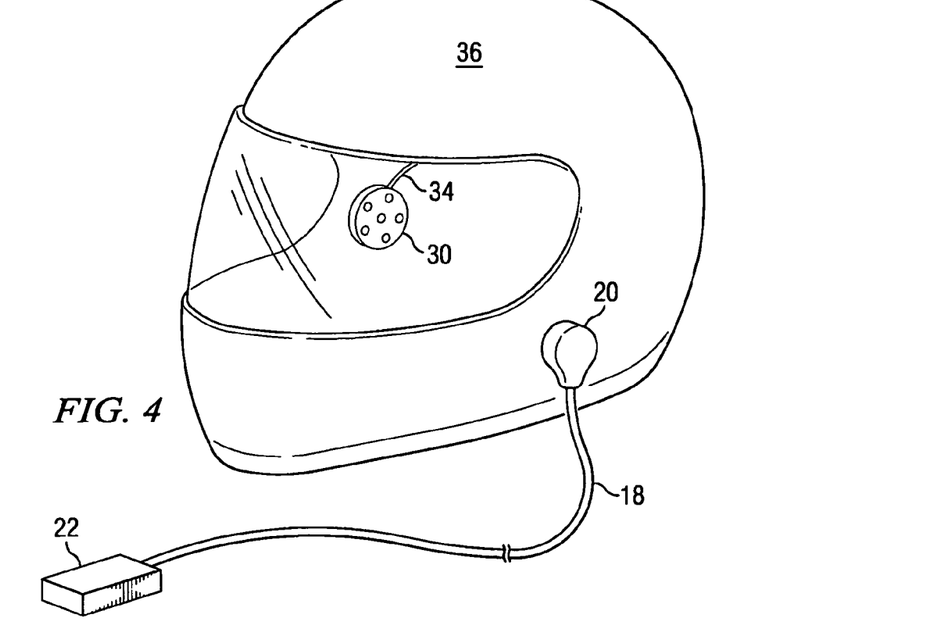
FIG. 4 is an external view of a helmet with the clampless headset mounting assembly of FIG. 1 attached according to the invention.

FIG. 4 is an external view of a helmet 36 with an attached clampless headset mounting assembly 10. An external cable 18, associated connector 20, and an external electronic communications device 22 are also illustrated. Additionally, a speaker 30 and its associated wire 34 are shown placed along the internal surface of the helmet.

Figure 5:
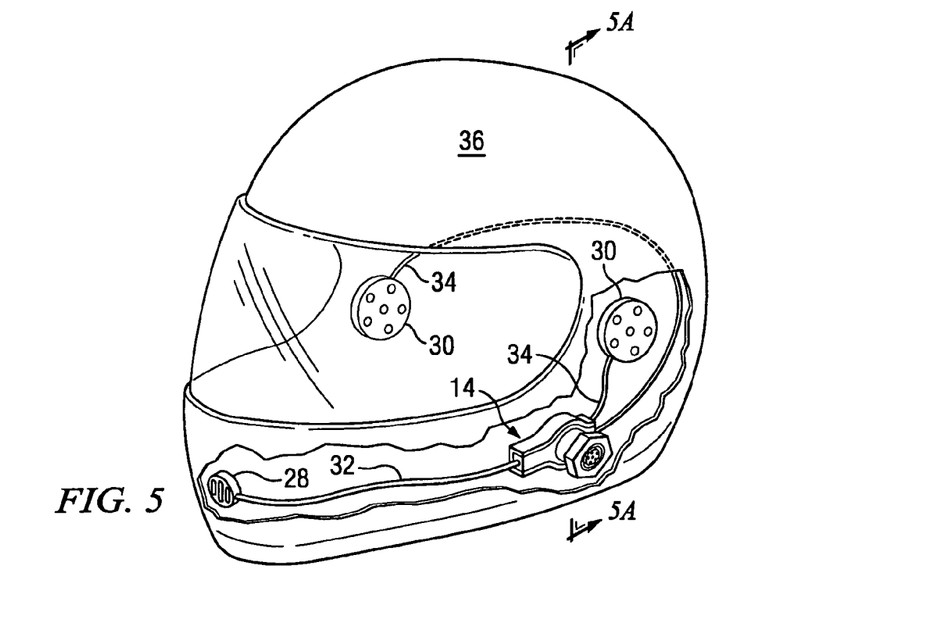
FIG. 5 is a cut-away illustration of a full-coverage style helmet with the clampless headset mounting assembly of FIG. 4 attached according to the invention.
Figure 5A:
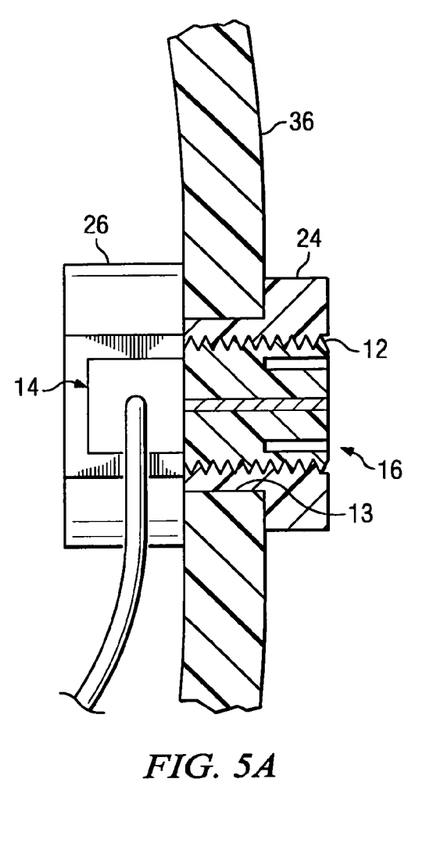
FIG. 5A is a cross-sectional view of the headset of FIG. 1 installed on the helmet.

FIG. 5 is a cut-away illustration of the helmet 36 with an attached clampless headset mounting assembly 10. The base 14, microphone 28, and microphone assembly 32 are illustrated residing inside the helmet 36. In this embodiment, the microphone assembly 32 is comprised of two or more wires connecting the base 14 to a stationary microphone 28 attached to the interior of the front of the helmet 36. FIG. 5A is a cross-sectional view of the headset of FIG. 5 installed on the helmet.

Figure 6:
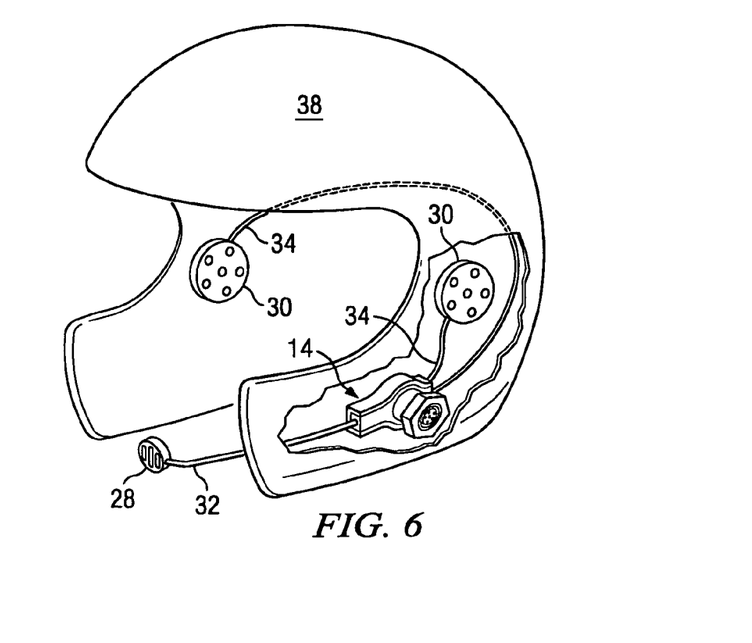
FIG. 6 is a cut-away illustration of an open-faced style helmet with the clampless headset mounting assembly of FIG. 4 attached according to the invention.

FIG. 6 is a cut-away illustration of an open face helmet 38 with an attached clampless headset mounting assembly 10. The base 14, microphone 28, and microphone assembly 32 are illustrated. In this embodiment, the microphone assembly 32 is comprised of a boom with inherent electrical pathways which can be adjusted to position the microphone 28 as desired by the helmet wearer.

A wearer of a helmet may wish to connect a clampless mounting assembly to one of a plurality of different types of external electronic communications devices 22. These different types of devices may require different combinations of electrical conductors through which they send and receive electrical signals. In order to accommodate a large range of types of communications devices, the numerous electrical conductors passing through the post 12 can be configured into a plurality of different subsets of conductors. Only the conductors necessary to communicate with an attached external electronic communications device 22 are used at any given time. Attaching a different external electronic communications device 22 may result in a different set of electrical conductors being selected. Electrical conductors necessary to communicate with an attached external electronic communications device 22 are referred to as active conductors. Unused electrical conductors are referred to as passive or unused conductors.

In order for the speakers 30 and microphones 28 of the headset assembly to communicate properly with the electrical conductors passing through the post 12, electrical signals must be switched. The means for selecting active conductors is shown in patent application Ser. No. 09/441,392, filed Nov. 16, 1999 ("SWITCHING MEANS"), herein incorporated by reference in its entirety. The SWITCHING MEANS is used to switch electrical signals between active conductors passing through the post 12 and the wires attached to the speakers 30 and microphones 28. Additionally, use of the SWITCHING MEANS may allow different types of microphones 28 or speakers 30 to be used.

Figure 7:
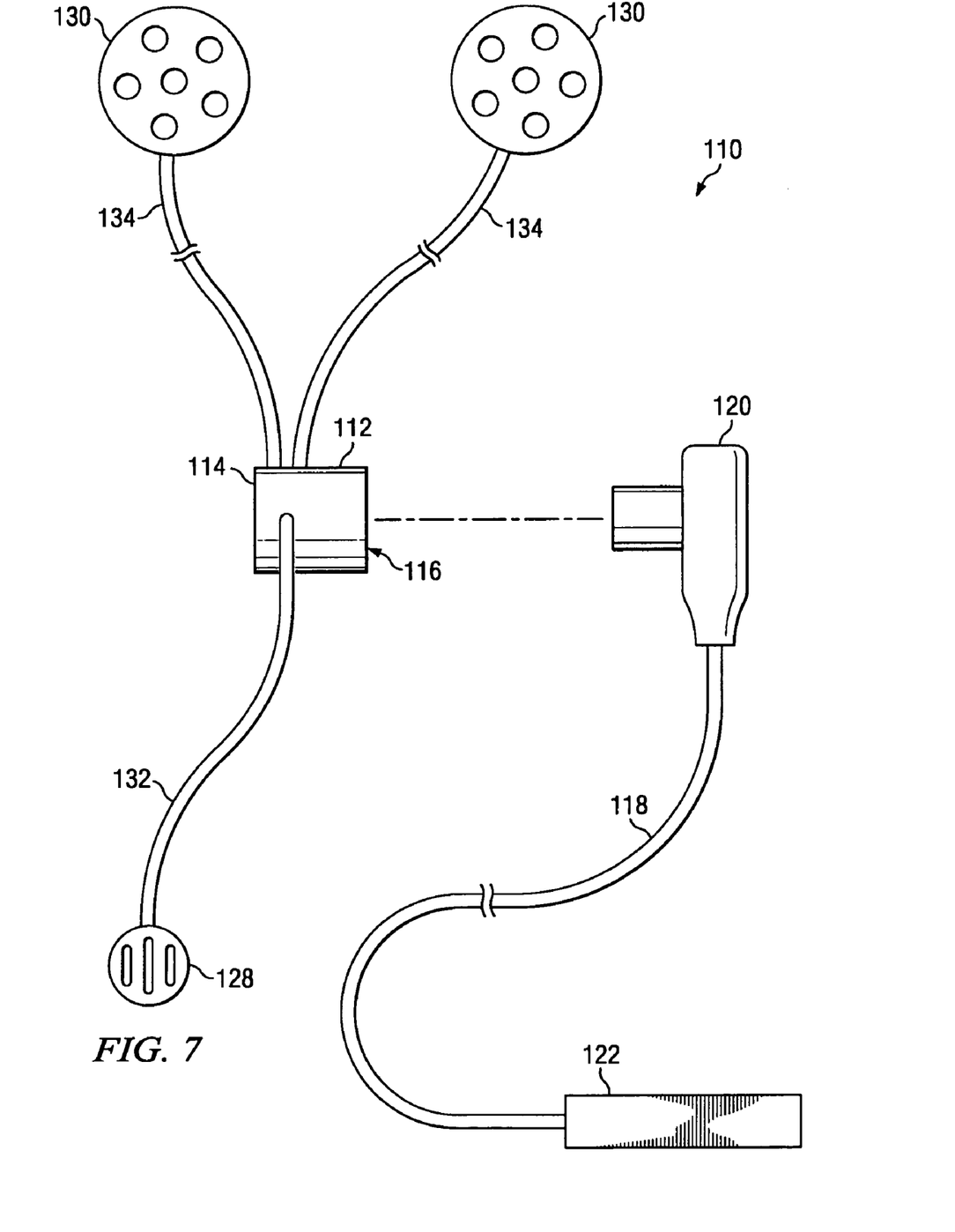
FIG. 7 is an exploded view illustrating another embodiment of a clampless headset mounting assembly according to the invention.

An alternate embodiment of a clampless helmet mounting assembly 110 is shown in FIG. 7. A mounting post 112 contains multiple alternative electrical pass-through conductors or wires which run from one end of the post to an opposite end of the post. In this embodiment of the invention, one end of the post 112 is formed into a base 114. The other end of the post forms a multiple-conductor connector 116. This connector 116 is used to electrically couple the multiple electrical pass-through conductors of the post to a wire harness or cable 118. The connector 116 also interfaces with another connector 120 attached to the cable 118. The cable 118 is used to provide an electrical connection between the helmet mounting assembly 110 and one or more external electrical communications devices 122 such as a radio, Cd player, tape player, or wireless telephone. In this use of the invention, these external electrical devices may reside on a vehicle such as a motorcycle, bicycle, ATV, or snowmobile.

Figure 9:
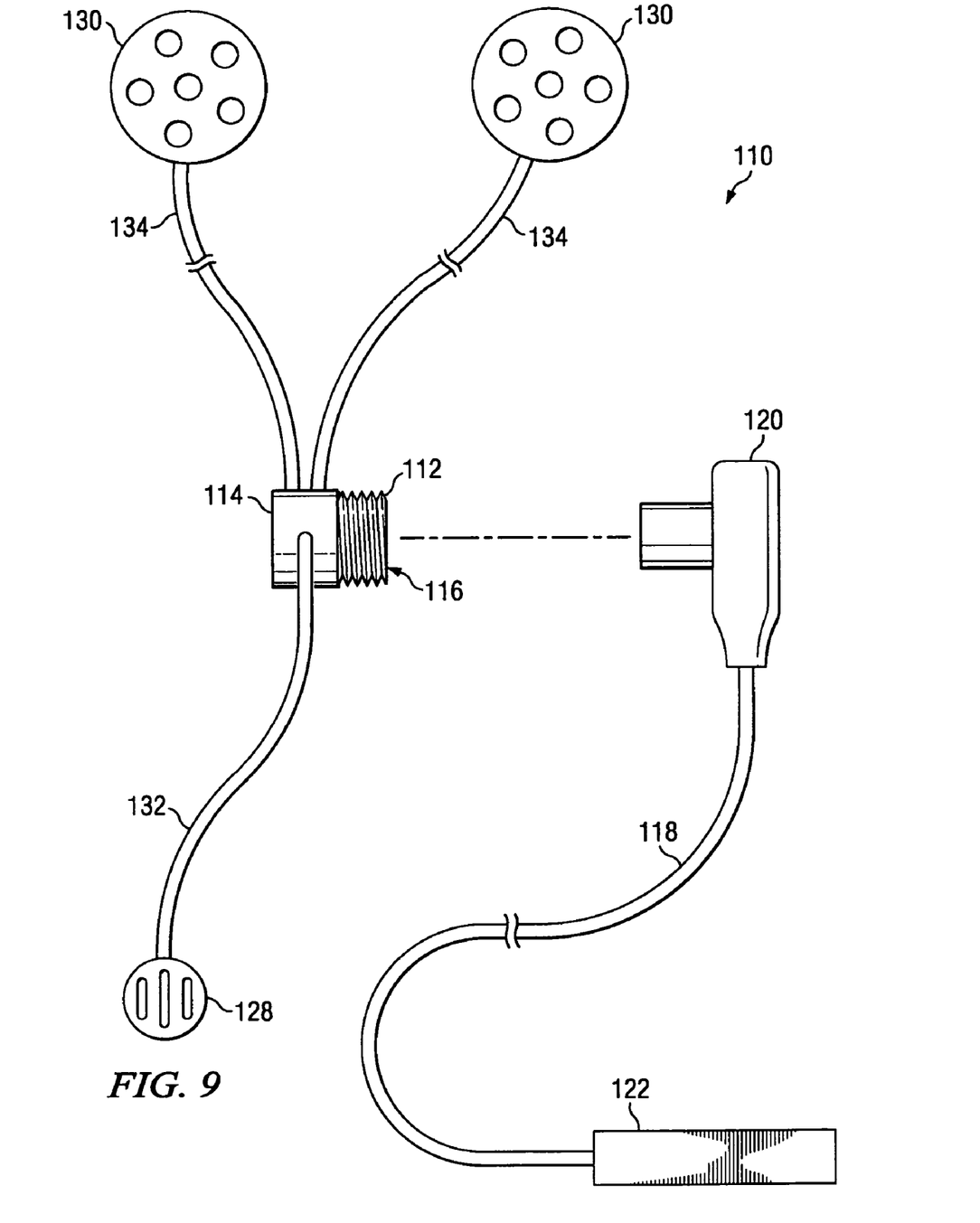
FIG. 9 is an exploded view illustrating yet another embodiment of a clampless headset mounting assembly according to the invention.

The mounting post 112 is inserted into an aperture which has been created in a helmet. The mounting post 112 may be sized with respect to the aperture in a manner that produces tension as the mounting post 112 is inserted, providing support for the mounting assembly. Other methods could be used to secure the mounting post 112 to the helmet. For example, the mounting post 112 may be secured to the helmet with glue or other adhesive. Or, as illustrated in FIG. 9, the mounting post may include threads which engage the helmet as the mounting post is screwed into the aperture.

The multiple electrical conductors passing through the mounting post 112 are connected to one or more transducers such as a microphone 128 or one or more speakers 130. In this embodiment of the invention, a boom microphone assembly 132 is attached to the base 114. Electrical conductors or wires electrically connect the microphone 128 to the conductors passing through the mounting post 112. The microphone assembly 132 may include a microphone 128, electrical wires, and a boom. A boom, if used, allows the wearer of the helmet to position the microphone 128 in a position which is comfortable and effective for converting his/her speech into electrical signals. These signals are passed through the microphone assembly 132, through the base 114, through the mounting post 112, through the post connector 116, through the additional connector 120, and through the cable 118 to an external electrical communications device 122.

Figure 8:
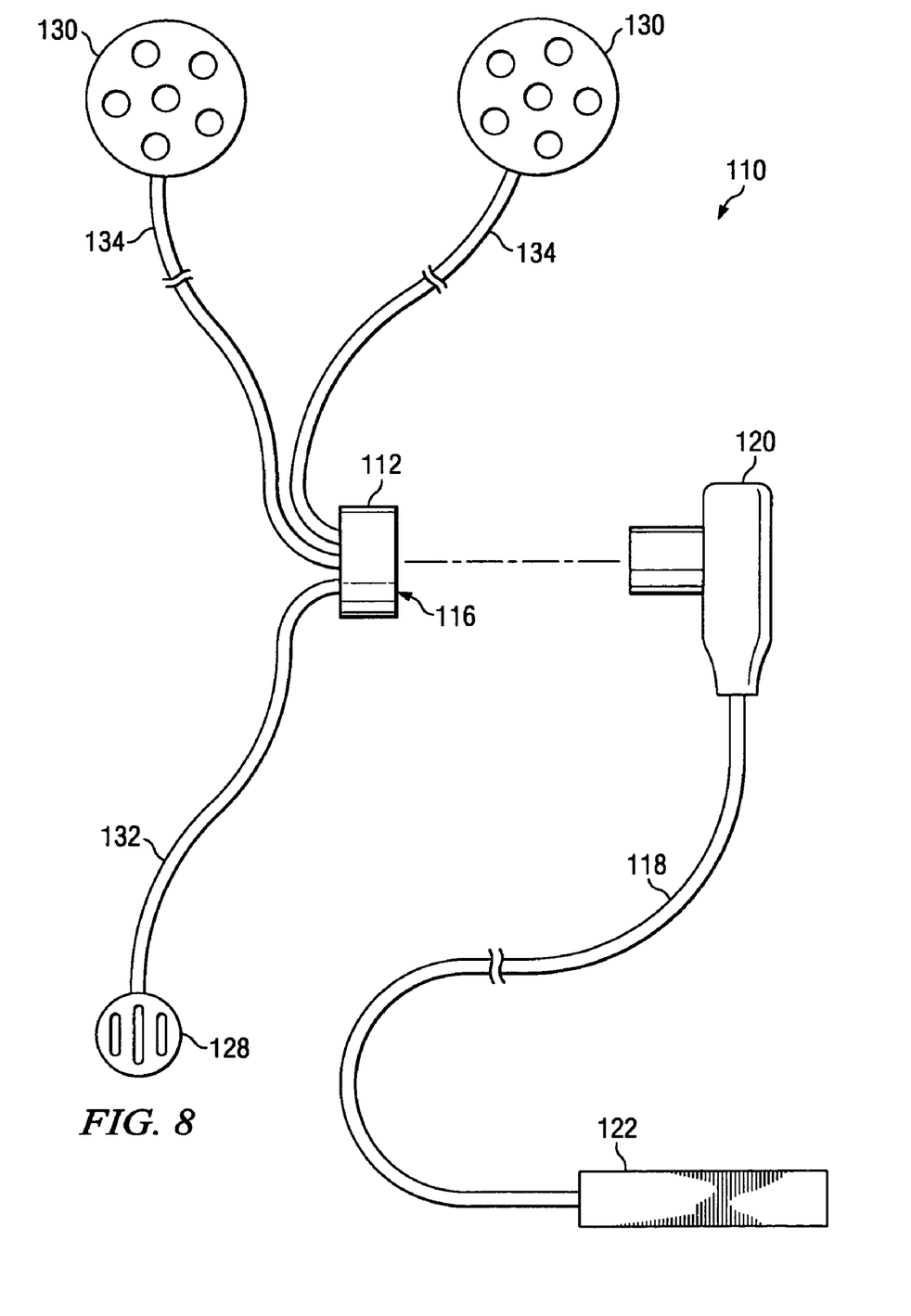
FIG. 8 is an exploded view illustrating another embodiment of the clampless headset mounting assembly of FIG. 7.
Figure 10:
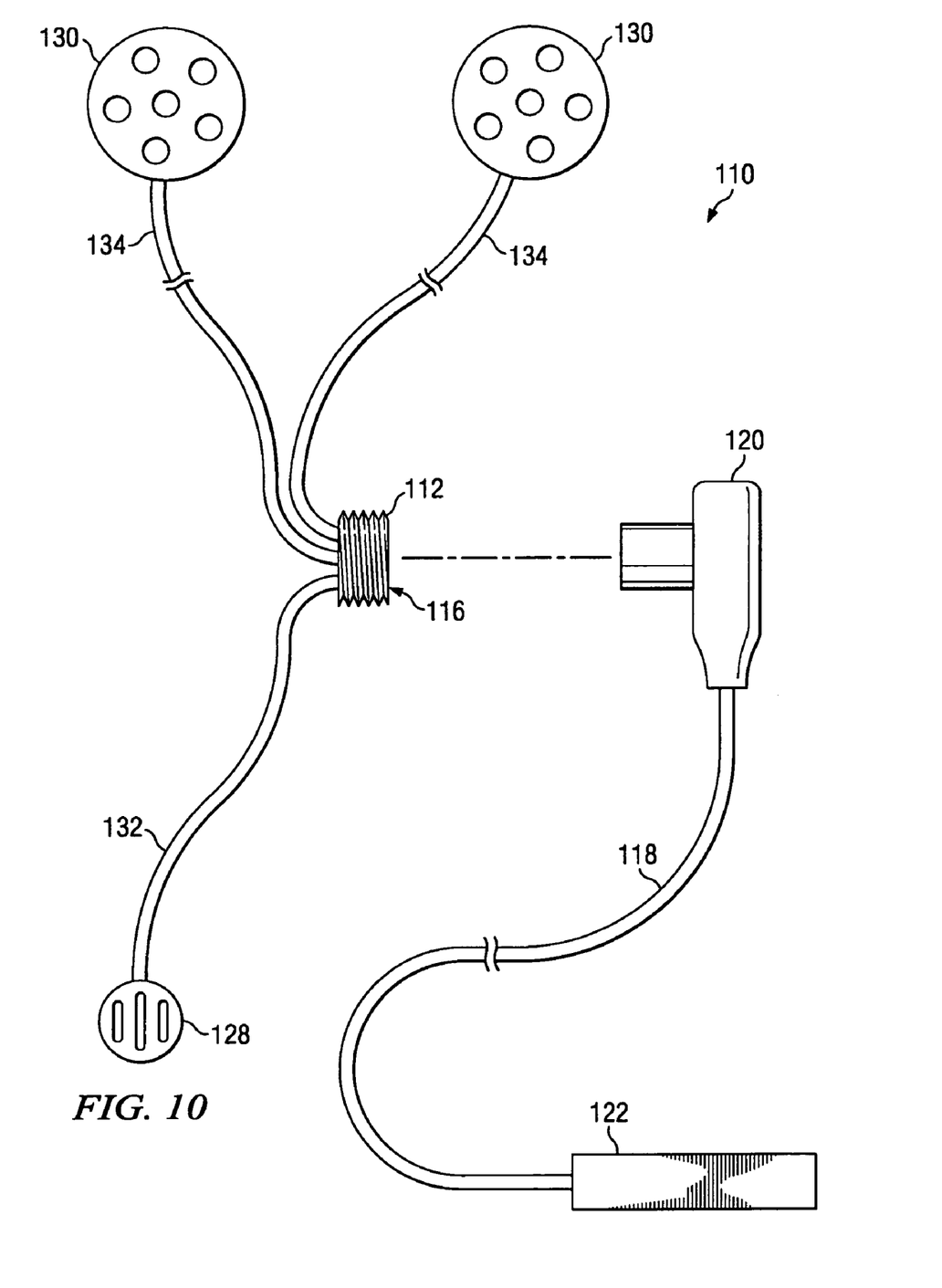
FIG. 10 is an exploded view illustrating another embodiment of the clampless headset mounting assembly of FIG. 9.

A variation of the clampless helmet mounting assembly 110 of FIG. 7 is illustrated in FIG. 8. Here, the base (FIG. 7) has been eliminated and wires 134 and boom microphone assembly 132 are inserted into one end of the mounting post 112. This variation may be used when it is desirable to fully insert the mounting post 112 into a helmet without leaving a base exposed outside of the helmet. Likewise, a variation omitting the base of the clampless helmet mounting assembly 110 of FIG. 9 is illustrated in FIG. 10.

Electrical signals originating from an external electrical communications device 122 are passed through the cable 118, through the mounting post 112, and through wires 134 to one or more speakers 130. The speakers 130 convert the electrical signals into acoustical energy.

Figure 11:
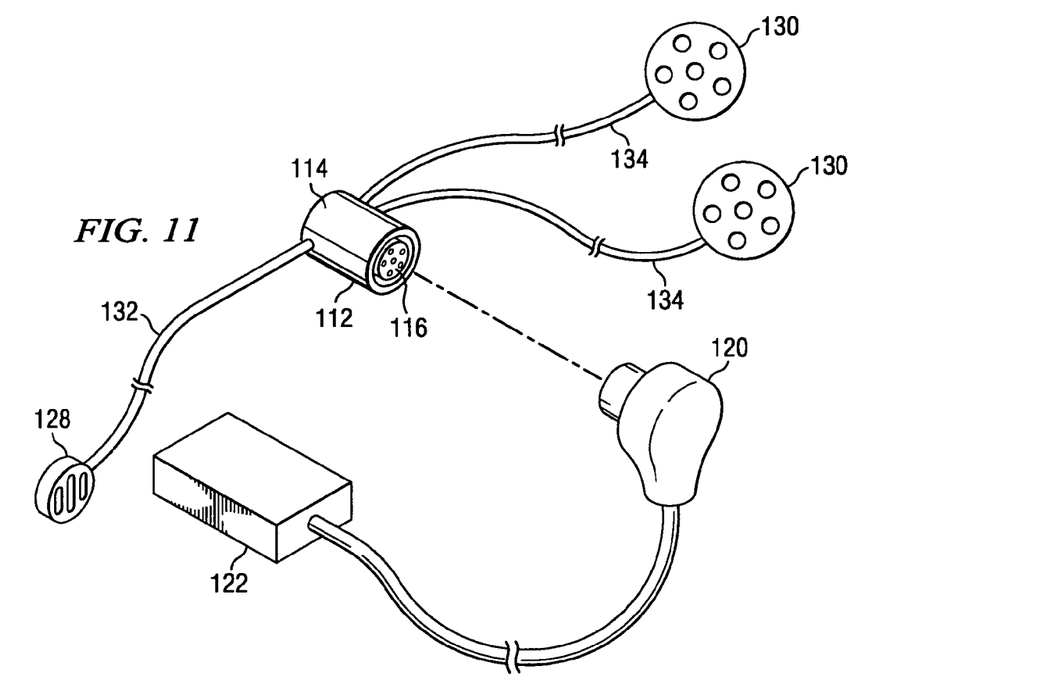
FIG. 11 is a perspective side view of the clampless headset mounting assembly of FIG. 7 illustrating electrical connectivity according to the invention.
Figure 12:
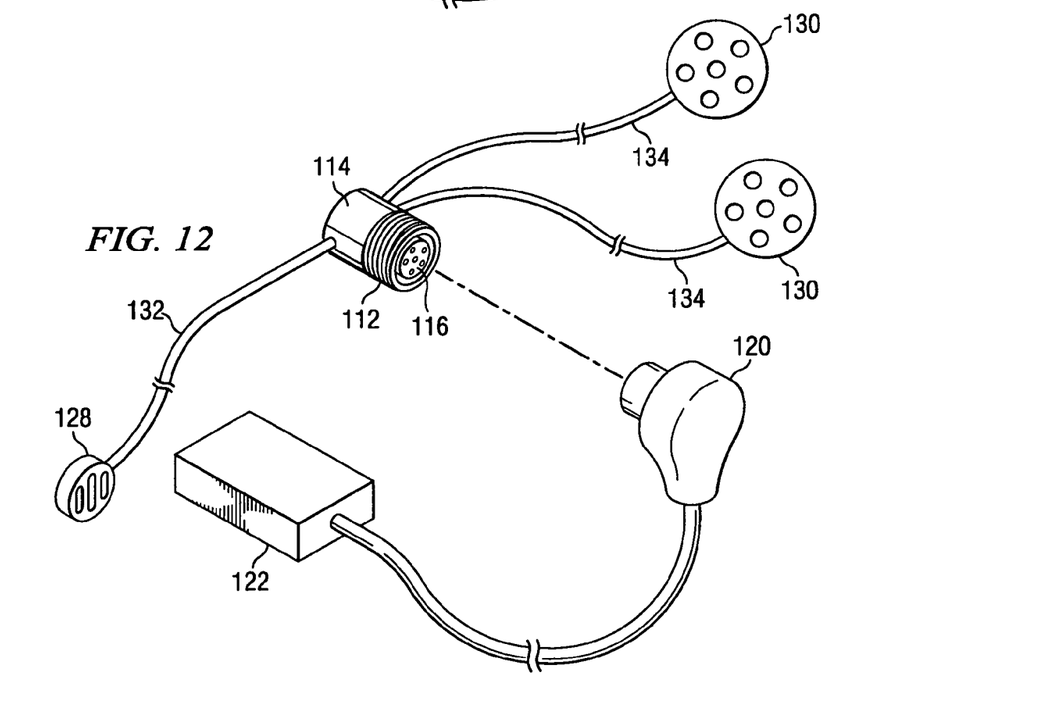
FIG. 12 is a perspective side view of the clampless headset mounting assembly of FIG. 9 illustrating electrical connectivity according to the invention.

A side view of the clampless helmet mounting assembly 110 of FIG. 7 is shown in FIG. 11. A similar side view of the clampless helmet mounting assembly of FIG. 9 is illustrated in FIG. 12.

Figure 13:
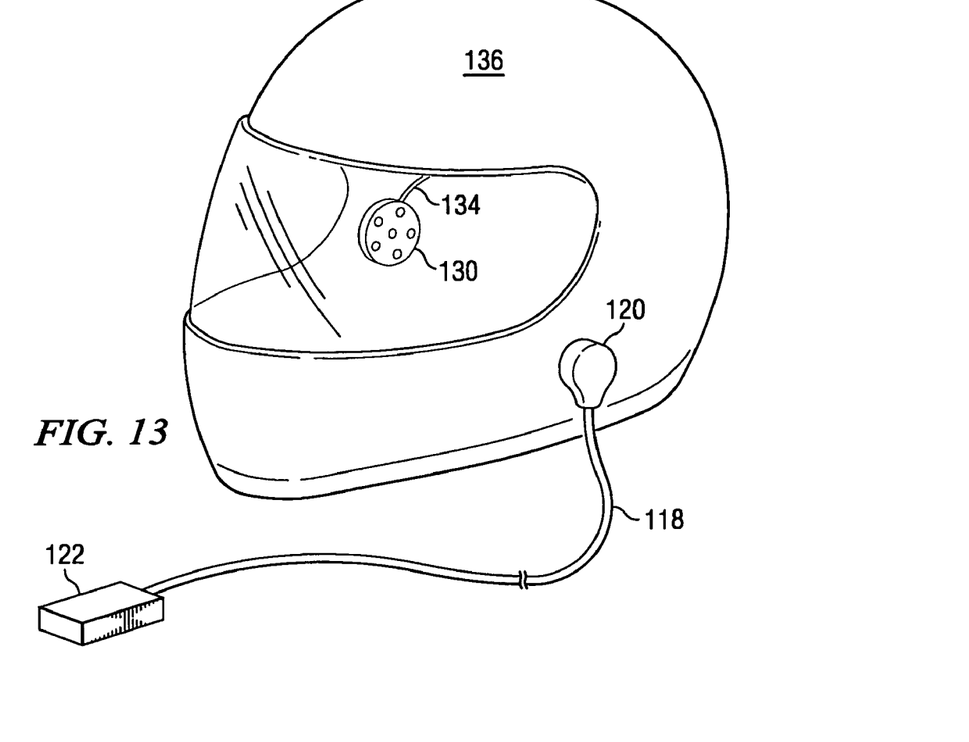
FIG. 13 is an external view of a helmet with the clampless headset mounting assembly of FIG. 9 attached according to the invention.

FIG. 13 is an external view of a helmet 136 with an attached clampless headset mounting assembly 110. An external cable 118, associated connector 120, and external electronic communications device 122 are also illustrated. Additionally, a speaker 130 and its associated wire 134 are shown placed along the internal surface of the helmet.

Figure 14:
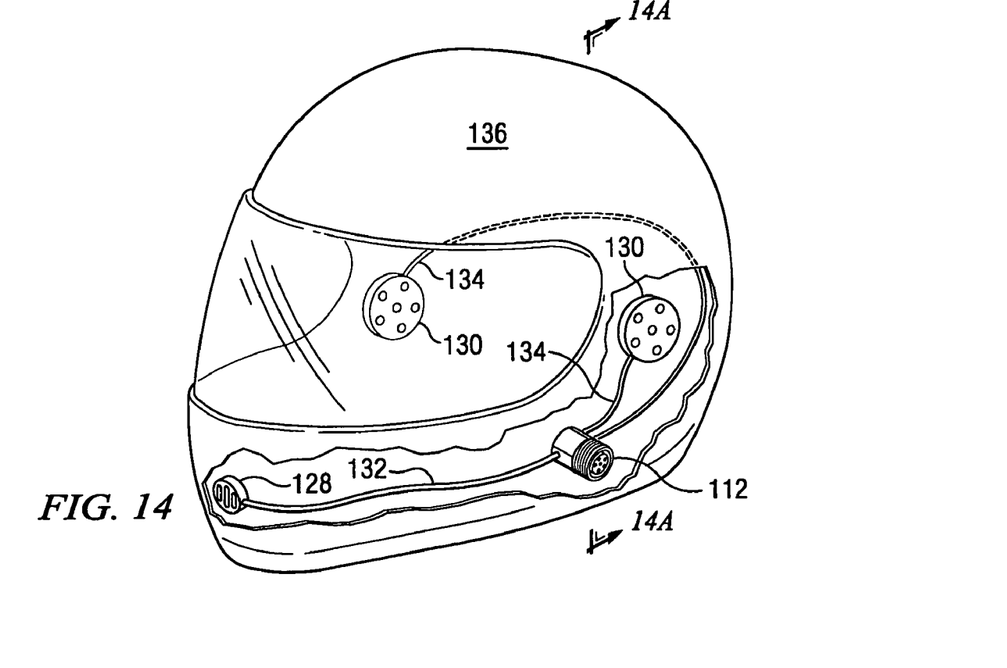
FIG. 14 is a cut-away illustration of a full-coverage style helmet with the clampless headset mounting assembly of FIG. 13 attached according to the invention.
Figure 14A:
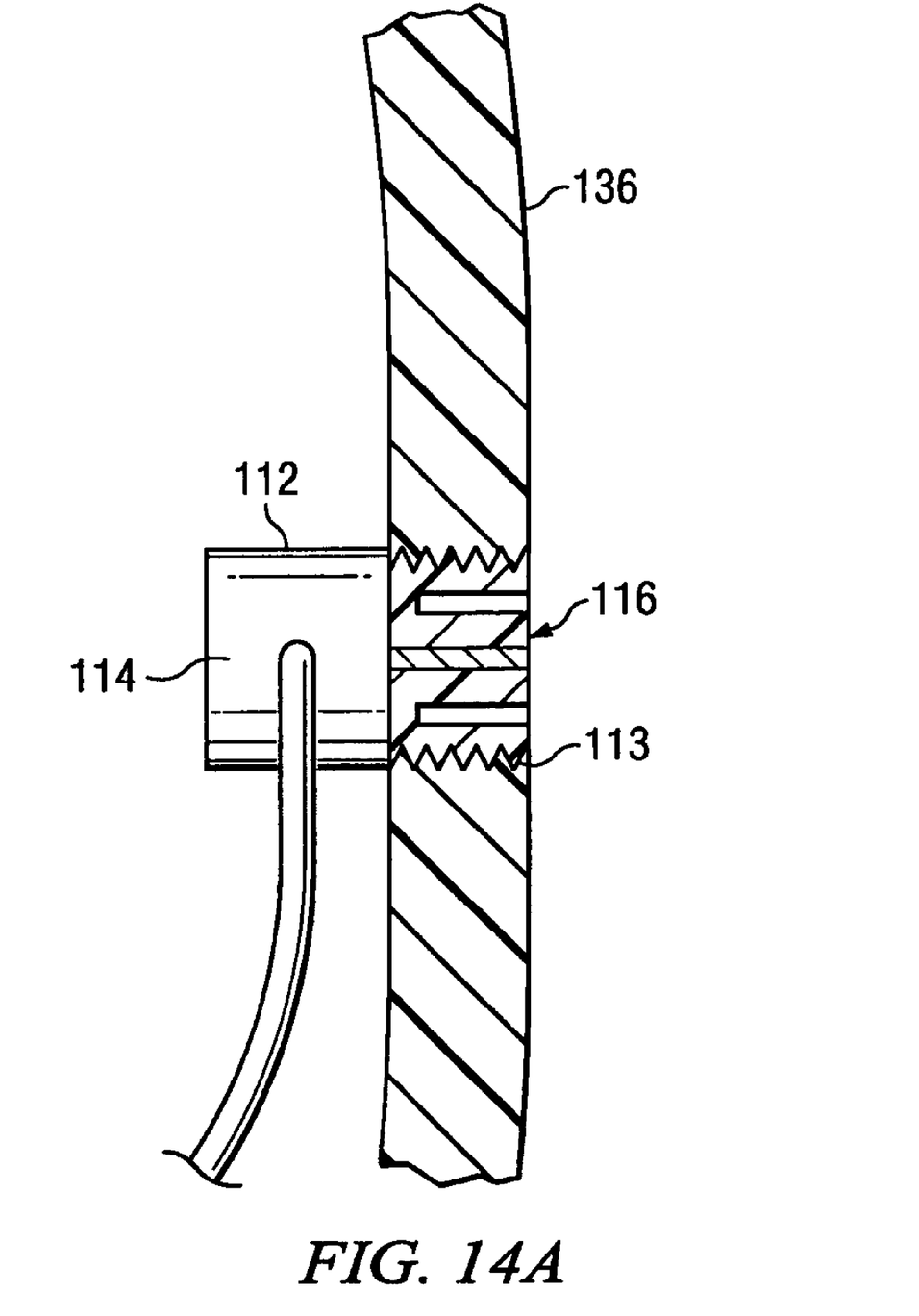
FIG. 14a is a cross-sectional view of the clampless headset mounting assembly of FIG. 14.

FIGS. 14 and 14a illustrate the helmet 136 of FIG. 13 with an attached clampless headset mounting assembly 110 as presented in FIG. 9. Here, the microphone 128 and microphone assembly 132 are illustrated residing inside the helmet 136. In this embodiment, the microphone assembly 132 is comprised of two or more wires connecting the mounting post 112 to a stationary microphone 128 attached to the interior of the front of the helmet 136.

The terms and expressions which have been employed in the foregoing specification are used therein as terms of description and not of limitation and there is no intention, in the use of such terms and expressions, to exclude equivalents of the features shown and described or portions thereof, it being recognized that the scope of the invention is defined and limited only by the claims which follow.

We claim:

1. A clampless mounting assembly for use with a helmet, comprising:
   a mounting post for inserting through an aperture in the helmet, the mounting post having multiple alternative electrical pass-through conductors that extend there-through and a first multiple-conductor connector on an exterior end of the mounting post, the first multiple-conductor connector being configured to accept each of a plurality of second multiple-conductor connectors being connected to external electrical communications devices;
   a speaker connected to at least one of the electrical pass-through conductors of the mounting post and being configured to mount within the helmet; and
   a microphone connected to at least one of the electrical pass-through conductors of the mounting post and being configured to mount within the helmet.

2. The clampless mounting assembly of claim 1, wherein the mounting post further comprises a first threaded portion for engaging the aperture.

3. The clampless mounting assembly of claim 1, wherein the mounting post is adapted to contact the aperture with sufficient tension so as to secure the clampless mounting assembly to the helmet.

4. The clampless mounting assembly of claim 1, further comprising a layer of adhesive applied to the mounting post and to the aperture of the helmet so as to secure the clampless mounting assembly to the helmet.

5. The clampless mounting assembly of claim 1, wherein the aperture comprises a threaded portion for engaging the mounting post.

6. The clampless mounting assembly of claim 2, wherein the aperture comprises a second threaded portion for engaging the first threaded portion.

7. A method of mounting a headset to a helmet, comprising:
   inserting a mounting post having multiple electrical pass-through conductors extending there-through into an aperture in the helmet;
   engaging the mounting post to the aperture;
   connecting a speaker to at least one of the electrical pass-through conductors of the mounting post;
   mounting the speaker into the helmet;
   connecting a microphone to at least one of the electrical pass-through conductors of the mounting post; and
   mounting the microphone into the helmet.

8. The method of claim 7, wherein the mounting post includes a first threaded portion.

9. The method of claim 8, wherein the step of engaging the mounting post to the aperture includes threading the first threaded portion into the aperture.

10. The method of claim 7, wherein the step of engaging the mounting post to the aperture includes gluing the mounting post to the aperture.

11. The method of claim 7, wherein the step of engaging the mounting post to the aperture includes sizing the mounting post relative to the aperture so as to create sufficient tension to secure the headset to the helmet.

12. The method of claim 7, wherein the aperture includes a threaded portion.

13. The method of claim 12, wherein the step of engaging the mounting post to the aperture includes threading the threaded portion onto the mounting post.

14. The method of claim 8, wherein the aperture includes a second threaded portion.

15. The method of claim 14, wherein the step of engaging the mounting post to the aperture includes threading the first threaded portion into the second threaded portion.

* * * * *

UNITED STATES PATENT AND TRADEMARK OFFICE
CERTIFICATE OF CORRECTION

PATENT NO. : 7,616,774 B2 Page 1 of 1
APPLICATION NO. : 11/256535
DATED : November 10, 2009
INVENTOR(S) : Lazzeroni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Nineteenth Day of October, 2010

David J. Kappos
*Director of the United States Patent and Trademark Office*